United States Patent Office 3,493,545
Patented Feb. 3, 1970

3,493,545
POLYMERS HAVING N-CYANOIMINE, N-CYANO-AZIRIDINE AND CYANAMIDE SUBSTITUENTS, AND THEIR PREPARATION BY REACTION OF CYANOGEN AZIDE WITH C=C OR C—H BONDS IN CORRESPONDING PARENT POLYMERS
Frank Dennis Marsh, Wilmington, Del., assignor to E. I. du Pont de Nemours and Company, Wilmington, Del., a corporation of Delaware
No Drawing. Original application July 16, 1964, Ser. No. 383,233. Divided and this application Jan. 13, 1969, Ser. No. 790,850
Int. Cl. C08g 33/02
U.S. Cl. 260—78.3                     15 Claims

ABSTRACT OF THE DISCLOSURE

Described are organic polymers having N-cyanoimine, N-cyanoaziridine and cyanamide substituents, and the process for obtaining them by reacting cyanogen azide at about −25° C. up to about 150° C. with nonaromatic >C=C< bonds and/or

bonds in corresponding parent polymers. The surface characteristics of the new polymers, especially dyability, are in general improved over those of the parent polymers.

RELATED APPLICATIONS

This application is a division of my copending application Ser. No. 383,233, filed July 16, 1964, as a continuation-in-part of my copending application Ser. No. 234,878, filed Nov. 1, 1962, and now abandoned.

BACKGROUND OF THE INVENTION

Field of the invention

This invention relates to, and has as its principal objects provision of, a novel process for introducing N-cyanoimine, N-cyanoaziridine and cyanamide substituents into polymers containing the carbon-hydrogen bond and/or the carbon-carbon double bond by reacting the same with cyanogen azide and the resulting novel polymers containing the introduced substituents.

Description of the prior art

Cyanogen azide is a recently synthesized compound described and claimed in my U.S. Pat. 3,410,658 of Nov. 12, 1968. The reaction of the cyanogen azide with monomeric compounds containing the carbon-hydrogen bond and/or the carbon-carbon double bond is described and claimed in my above-mentioned application Ser. No. 383,233, of which this is a division. The reaction of cyanogen azide with benzenoid compounds is described and claimed in my U.S. Pat. 3,268,512 of Aug. 23, 1966.

DESCRIPTION OF THE INVENTION

In its process aspect, the present invention comprises contacting cyanogen azide with an organic polymer at a temperature in the range from about −25° C. to up to about 150° C. The precise temperature employed will depend upon the polymeric reactant, an ethylenically unsaturated compound reacting generally at a lower temperature than a saturated one. Thus, ethylenically unsaturated groups in the polymer will usually react at a temperature ranging from about −25° C. to 75° C., 0° C. to 55° C. normally being used, while saturated C—H groups will react at about 25° C. to 150° C., 40° C. to 100° C. being preferred. The ethylenically unsaturated groups will, of course, react at the higher temperatures and, when both carbon-hydrogen and carbon-carbon double bonds are present, reaction will occur at both groups above about 40° C.

The pressure used is not critical and will generally be atmospheric or moderately elevated.

The time required to effect reaction will vary from a few minutes with highly reactive ethylenic polymers to several hours or more with less reactive polymers. The course of the reaction can be followed, if desired, by measuring the amount of nitrogen evolved, one molecule of nitrogen being liberated for each molecule of cyanogen azide that reacts.

The cyanogen azide used in the reaction can be preformed or formed in situ. Cyanogen azide can be preformed as shown in U.S. Pat. 3,410,658.

Cyanogen azide is shock sensitive and to some extent thermally unstable. Its solutions in organic solvents, e.g., acetonitrile, ethyl acetate, or toluene, however, are stable for several days at room temperature and can be stored indefinitely at temperatures below 0° C. The temperature of storage should not be so low as to cause the solvent to solidify or to reduce the solubility of the cyanogen azide to the extent that it separates as a substantially solvent-free, shock-sensitive second phase. Preferred storage temperatures are at −30° C. to 0° C.

Solutions containing up to 90% or even higher amounts of cyanogen azide in organic solvents can be prepared by the reaction of cyanogen chloride with either an alkali metal or ammonium azide as described in U.S. Pat. 3,410,658. Solutions containing in the neighborhood of 20 to 40% by weight of cyanogen azide are, however, preferred for reasons of safety and convenience in handling.

Because of the relative instability of cyanogen azide, it is best to generate it either in the presence of the polymer reactant dissolved, dispersed or immersed in a reaction medium, or in the presence of a reaction medium alone. In the latter procedure, the polymeric reactant is brought into contact with the medium which contains the preformed cyanogen azide. Alternatively, the cyanogen azide solution can be added to the reaction medium containing the polymeric reactant.

In the preparation of the products of this invention there can be used any organic polymer containing an aliphatic carbon-hydrogen bond. The polymer can contain acyclic or carbocyclic and saturated or ethylenically unsaturated recurring units or end groups, but should be free of acetylenic unsaturation. The presence of aromatic unsaturation, in addition to ethylenic, is immaterial although competing reactions may take place.

There is nothing critical about the proportions of cyanogen azide and the polymer, and one or the other reactant can be present in excess. The reaction with cyanogen azide can be controlled to take place at part or all of any ethylenic double bonds present in the polymer molecule, depending upon the ratio of the reactants and conditions of reaction selected. However, only a relatively minor proportion of saturated C—H groups in an essentially saturated polymer will normally react with cyanogen azide. It is not necessary to react more than a small proportion of either the >C=C< or saturated C—H groups in a polymer molecule to impart to it chemical properties associated with the substituent N-cyanoimine, N-cyanoaziridine or cyanamide groups.

The reaction medium used should be one which is normally liquid and substantially inert toward the reactants and reaction products at the reaction temperature employed. It is therefore to be understood that the medium in any one instance must be selected with due consideration of the reaction conditions to be used. Suitable reaction media for polymeric reactants containing olefinic unsaturation are propionitrile, acetonitrile, ethyl acetate, amyl acetate, 1,2-dimethoxyethane, dimethylformamide, 1,1,2,2-tetrachloroethane, isooctane, methylene chloride, carbon tetrachloride, and 1,2-dibromoethane.

The nature of the reactions between cyanogen azide and the polymeric reactant depends upon whether reaction occurs at a saturated or ethylenically unsaturated site. When ethylenically unsaturated sites are present, any reaction occurring at low temperatures, i.e., below 50° C., is essentially exclusively at the double bonds with virtually no attack at carbon-hydrogen bonds. At temperatures above 50° C., cyanogen azide decomposes to nitrogen and cyanonitrene,

and the latter reacts rapidly both with double bonds and with carbon-hydrogen bonds.

In the case of polymers containing ethylenic unsaturation, the reaction can proceed with the formation of either an N-cyanoaziridine or an N-cyanoimine, or both. A general equation can thus be written, employing for illustration the olefinic bond, as:

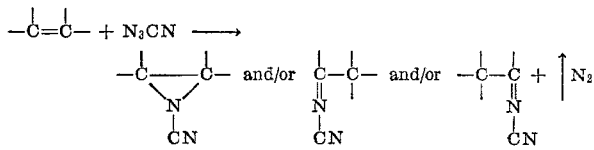

It will be understood that the equation above, like those given subsequently, (1) is not intended to imply that only one molecule of cyanogen azide can react with the polymeric reactant, but rather illustrate the reaction in a very general, simplified form, and (2) does not account for rearrangement accompanying the N-cyanoimine-forming reaction.

As the equation illustrates, the reactions leading to formation of N-cyanoaziridines and N-cyanoimines are competitive. The relative proportions of the two in any one instance will, therefore, vary depending upon the particular polymeric reactant used, the conditions employed, and the reaction medium. Generally, the use of polar reaction media favors the N-cyanoaziridine-forming reaction, and conversely nonpolar reaction media favor the N-cyanoimine-forming reaction. This effect of the medium in favoring N-cyanoaziridine or N-cyanoimine formation is illustrated more explicitly in relation to nonpolymeric reactants in my copending application Ser. No. 383,233.

Examples of polymers containing ethylenic double bonds which can be used in this invention are polybutadiene, polychloroprene, ethylene/propylene/butadiene polymers, ethylene/propylene/hexadiene polymers, isobutylene/butadiene polymers, styrene/butadiene/acrylonitrile polymers, drying oil-modified glycerol triphthalate polymers, and natural rubber. To effect substantial reaction, the polymer should be in solution. However, a significant degree of modification of the polymer surface can be effected by treating formed structures, e.g., fibers and films, of the unsaturated polymers with cyanogen azide or solutions of cyanogen azide.

In the case of polymers which are essentially saturated, i.e., any unsaturation is limited to end groups in a vinyl-type polymer, the reaction with cyanogen azide proceeds at temperatures above 50° C. at a carbon-hydrogen bond with the elimination of nitrogen and formation of a polymer having cyanamide substituents, e.g.,

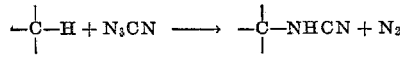

Examples of polymers which have carbon-hydrogen bonds and which are essentially free of aliphatic carbon-carbon unsaturation are polyethylene, polyvinyl fluoride, polyvinylidene chloride, polyvinyl acetate, polystyrene, poly(methyl vinyl ketone), poly(methyl acrylate), poly(methyl methacrylate), polyacrylonitrile, polypropylene, polyisobutylene, hydrogenated natural rubber, polypivalolactone, polymerized lactic and glycolic acids, polyoxymethylenes, copolymers of formaldehyde with epoxides, e.g., ethylene oxide, copolymers of formaldehyde with ethylene, propylene, etc., copolymers of trifluoroacetaldehyde with formaldehyde, etc.

The novel products of this invention are:

(1) Polymers containing at least one NC—N= substituent wherein said substituent may be doubly bonded to a single carbon in the polymer or singly attached to two adjoining carbon atoms. These modified polymers are obtained by reaction of cyanogen azide with polymers containing ethylenic unsaturation. It is not possible to devise a precise structural formula for such products, but they can be represented graphically as in Formula I:

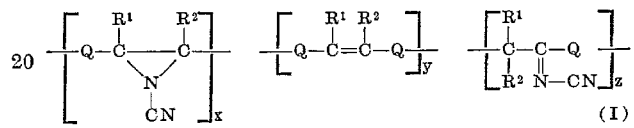

wherein the R's ($R^1$ and $R^2$) individually are members of the group consisting of hydrogen, halogen, nitro, hydroxy, cyano, alkoxy, aryloxy, alkylsilyl, alkylthio, acyl, acyloxy, carboxyl, carbamoyl, N-hydrocarbylcarbamoyl, hydrocarbyloxycarbonyl, e.g., alkoxycarbonyl, hydrocarbyl, including alkyl, aryl, aralkyl, alkylaryl, cycloalkyl, and alkenyl, and substituted hydrocarbyl groups containing one or more of the previously mentioned groups as substituents, e.g., haloalkyl, haloaryl, hydroxyalkyl, hydroxyaryl, cyanoalkyl, cyanoaryl, alkoxyalkyl, and alkoxyaryl, said R's individually containing up to 18 carbons; where any two R's may be joined together to form an alkylene or oxygen-interrupted alkylene group of up to 14 carbons; Q represents a segment of the polymer molecule; and $x$, $y$ and $z$ are cardinal numbers which vary in magnitude depending on the molecular weight of the polymer, the degree of unsaturation of the original polymer, and the degree of modification and which will generally have a sum greater than 10, with the proviso that the sum of $x$ and $z$ is at least one.

(2) The products obtained by reaction of cyanogen azide with saturated polymers. They generally contain cyanamido groups, —NHCN, pendent from aliphatic carbon of the main carbon chain but may also contain some —NHCN groups attached to side chains in the polymer. It is not possible to give a precise structural formula for such products, but in general they can be approximately represented graphically in Formula II:

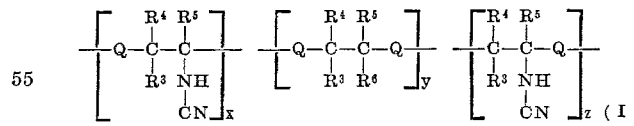

in which the R's ($R^3$, $R^4$, $R^5$ and $R^6$) are as previously defined, Q is a segment of the polymer molecule, and $x$, $y$ and $z$ are cardinal numbers which vary in magnitude depending on the molecular weight of the polymer. Generally, the sum of $x$, $y$ and $z$ is greater than 10.

EMBODIMENTS OF THE INVENTION

There follow some examples which are intended to illustrate, but not to limit, the invention. Examples 1 and 2 show the reaction of cyanogen azide with ethylenically unsaturated polymers and Examples 3–11 show the reaction with saturated polymers.

Warning: Cyanogen azide, a reactant in the process of these examples, is explosive when free or nearly free of solvent and should be handled with great care. It can be used, however, with comparative safety in dilute or moderately concentrated solution.

EXAMPLE 1

A solution of cyanogen azide (0.168 mole) in 100 ml. of toluene was added to 8 g. of cis-polybutadiene dissolved in 400 ml. of toluene and the resulting solution was heated for 20.5 hours at 40–44° C. During this period 2.8 liters of nitrogen evolved, and the modified polymer precipitated from solution. Analysis of the modified polymer (10.0 g.) after washing with isopropyl alcohol and drying showed that it contained approximately 16% (16.18; 16.29%) of chemically bound nitrogen. The nitrogen is believed to be in the form of

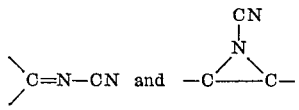

groups interspersed along the polymer chain. The modified polymer is much less soluble in toluene than the original polymer.

EXAMPLE 2

A solution of 2 g. of 50% trans, 40% cis and 10% 1,2-polybutadiene in 100 ml. of toluene was treated with 40 ml. of a 2.5 molar toluene solution of cyanogen azide and heated to 75° C. for 1 hour. There was evolved 0.75 liter of nitrogen, and the precipitated polymer was washed with isopropanol and dried to yield 2.25 g. of a product containing

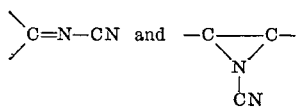

units interspersed along the polymer chain. The product analyzed: N, 13.29%.

EXAMPLE 3

Polyvinyl fluoride (11.5 g., 0.25 mole) was suspended in 250 ml. of ethyl acetate and 10 ml. (0.013 mole) of cyanogen azide in acetonitrile was added. The mixture was refluxed for 3 hours, and the solid was separated by filtration and dried in vacuo. Nitrogen elemental analysis indicated the presence of 2.26% nitrogen, which corresponds to 7 mole percent of —NHCN groups. The solid product was refluxed for 4 hours in a 10% aqueous hydrochloric acid solution, the solid product which formed was removed by filtration, washed well with water, and dried in vacuo. Analysis showed the product to contain 1.13% nitrogen, which corresponds to 4.2 mole percent of

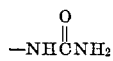

groups.

EXAMPLE 4

To a flask equipped with thermometer, magnetic stirrer, and condenser attached to a wet test meter was added an ethyl acetate solution of cyanogen azide (12.90 g., 0.195 mole of N$_3$CN diluted to 75 ml. with ethyl acetate) and several strips of polyethylene film (Alathon® 10,[1] mil x 0.5 in. x 2 in.). This mixture was stirred and heated at 47–68° C. for 23 hours, during which time approximately 0.2 mole of nitrogen was liberated. The films were separated from the solution, washed with acetone, and dried. The infrared spectrum of these films showed absorption at 3.0μ (NH), 4.5μ, 4.52μ (CN) in addition to the normal absorption for polyethylene.

*Analysis.*—Found: N, 5.69, 5.27.

A sample of this film when suspended in a 1% solution of Sevron® Orange [2] and heated on a steam bath for one hour readily accepted the dye while the unmodified polyethylene film was unchanged.

A portion of the polymer containing —NHCN groups was hydrolyzed to the corresponding urea by stirring with excess 15% aqueous hydrochloric acid at room temperature for 48 hours. The infrared spectrum of this film showed no absorpiton in the 4.5μ region (CN) but showed strong absorption at 3.1–3.2μ (NH) and 5.9–7.0μ region. A sample of this film was readily dyed by Sevron® Blue [2] when treated as described above.

EXAMPLE 5

Several oriented polypropylene film strips (1 mil x ½ x 4½ in.) were suspended in an ethyl acetate solution of cyanogen azide (12.9 g., 0.195 mole N$_3$CN diluted to 75 ml. with ethyl acetate) and heated with stirring at 48–52° C. for 24 hours, during which time approximately 0.2 mole of nitrogen was liberated. The films were separated from the mixture, washed with acetone, and dried.

*Analysis.*—Found: N, 15.18, 15.68.

Infrared analysis showed strong absorption at 3.0–3.2μ (NH) and 4.45, 4.6μ (CN) in addition to the normal absorption for polypropylene.

Hydrolysis of a portion of this film with 15% aqueous hydrochloric acid as described above converted the cyanamide functions to urea groups as shown by the disappearance in the infrared spectrum of absorption peaks at 4.45 and 4.6μ and the formation of new peaks at 5.9–7.0μ.

EXAMPLE 6

A nonwoven polypopylene fabric was treated with cyanogen azide in acetonitrile as described above. A portion of the product was hydrolyzed to the corresponding urea with aqueous hydrochloric acid, as already described. Each of these products was heated on a steam bath for one hour with a 1% solution Sevron® Blue 2–G [2] and acidified with acetic acid. The products, after washing and drying, were bright blue. The unmodified polypropylene fabric control accepted no dye.

Substitution of Anthraquinone® Blue SWF [2] for the Sevron® Blue 2–G [2] and treatment in a similar manner yielded products dyed a bright blue. Other dyes such as Carmine® 2–G,[2] Capracyl® Red-B,[2] and Sevron® Brilliant Red [2] similarly gave good dye adsorption.

EXAMPLE 7

Several strips of polyvinyl fluoride films (½ in. x 4 in. x 1 mil) were treated with cyanogen azide in ethyl acetate (17 g., 0.25 mole diluted to 50 ml. with ethyl acetate) at 46°–57° C. for 26 hours, during which time nitrogen was liberated. The resulting films after washing with acetone and drying contained 0.29% nitrogen and showed absorption in the infrared at 3.0μ (NH) and 4.5, 4.6μ (CN).

EXAMPLE 8

Several small pieces of fabric woven from polypivalolactone fibers were treated with methylene chloride solution of cyanogen azide (0.088 mole, 5.9 g., diluted to 75 ml. with CH$_2$Cl$_2$) at 39°–42° C. for 20 hours as described above. The fabric was separated from the solution, washed successively with acetone, soap and water and finally with distilled water. A portion of this fabric was treated with excess 10% hydrochloric acid for 20 hours at room temperature. The hydrolyzed product was successfully dyed with Anthraquinone® Blue [2] and Sevron® Brilliant Red.[2] A control accepted no dye.

EXAMPLE 9

Bulk polypivalolactone (15 g. as a fine powder) was suspended in a methylene chloride solution of cyanogen azide (12.9 g., 0.19 mole diluted to 124 cc. with CH$_2$Cl$_2$) and heated with stirring at 42° C. for about 50 hours. Filtration of this mixture separated a tan powder containing 10.41% nitrogen. A portion of this product was stirred

---

[1] Du Pont trademark for polyethylene resins.
[2] Du Pont trademark for dyes.

with excess 10% hydrochloric acid at room temperature for 24 hours, filtered, washed with water, and dried. This hydrolyzed product contained 7.8, 8.12% nitrogen.

EXAMPLE 10

An alkyl-capped formaldehyde polymer (15 g., 0.5 mole) was suspended in 300 ml. of ethyl acetate and 20 ml. (0.025 mole) of cyanogen azide in acetonitrile was added. The mixture was refluxed for three hours, cooled, and the solid was removed by filtration. The solid product obtained was washed with refluxing water for three hours and dried. A nitrogen elemental analysis indicated the presence of 3 mole percent of

groups.

EXAMPLE 11

A copolymer containing approximately 40% of hexafluoropropylene and 60% of vinylidene fluoride by weight (36 g., 0.175 mole) was dissolved in 300 ml. of refluxing acetonitrile and 20 ml. (0.024 mole) of cyanogen azide in acetonitrile solution was added. The solution was refluxed for 2 hours, cooled, the solvent evaporated, and the residue treated with hot 10% aqueous hydrochloric acid for 18 hours. The rubbery product obtained was dried. A nitrogen elemental analysis indicated that 13 mole percent of

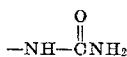

groups was present.

The ethylenically unsaturated polymers which have been treated with cyanogen azide in accord with this invention can be used in making coating compositions and shaped objects, e.g., films. Such compositions and objects are more solvent resistant than those made of corresponding unmodified polymers (see Example 1). The modified polymers can be reduced by standard methods, e.g., catalytic hydrogenation, to produce amino-substituted polymers. When the modified polymers are subjected to hydrolysis, carbonyl groups are introduced which provide sites for further modification, for example, by reaction with aldehydes and oximes. The oximated products upon reduction also produce polymers which contain amine groups. Oxidation of the carbonyl group-containing polymers converts them to carboxylic acids. This invention therefore provides a means for converting hydrocarbon polymers to high molecular weight amines and carboxylic acids.

As illustrated in Examples 4, 6 and 8, the presence of the cyanimide group confers improved dye acceptance to the polymer. Hydrolysis of the cyanamid substituents converts them to urea groups, as shown in Examples 3–6 and 8–11, and the urea-substituted polymers also show improved dye acceptance. The derived urea-substituted polymers can also be modified further, for example, by treatment with aldehyde.

Since obvious modifications and equivalents in the invention will be obvious to those skilled in the chemical arts, I propose to be bound solely by the appended claims.

The embodiments of the invention in which an exclusive property or privilege is claimed are defined as follows:

1. The process which comprises
    reacting, at a temperature in the range −25° C. to 150° C.,
    a polymer containing at least one recurring member of the group consisting of carbon-hydrogen bonds and nonaromatic carbon-carbon double bonds with cyanogen azide.
2. The process of claim 1 wherein the initial polymer is a hydrocarbon.
3. The process of claim 1 wherein the initial polymer is a polybutadiene.
4. The process of claim 1 wherein the initial polymer is a polyethylene.
5. The process of claim 1 wherein the initial polymer is a polypropylene.
6. The process of claim 1 wherein the initial polymer is a polyvinyl fluoride.
7. The process of claim 1 wherein the initial polymer is a polypivalolactone.
8. The process of improving the surface characteristics of a solid polymer containing at least one recurring member of the group consisting of carbon-hydrogen bonds and nonaromatic carbon-carbon double bonds which comprises
    reacting the same with cyanogen azide at a temperature in the range of −25° C. to 150° C.
9. A polymer initially containing at least one recurring member of the group consisting of carbon-hydrogen bonds and nonaromatic carbon-carbon double bonds,
    modified by treatment with cyanogen azide at a temperature in the range of −25° C. to 150° C.
10. The composition of claim 9 wherein the initial polymer is a polybutadiene.
11. The composition of claim 9 wherein the initial polymer is a polyethylene.
12. The composition of claim 9 wherein the initial polymer is a polypropylene.
13. The composition of claim 9 wherein the initial polymer is a polyvinyl fluoride.
14. The composition of claim 9 wherein the initial polymer is a polypivalolactone.
15. A solid polymer initially containing at least one recurring member of the group consisting of carbon-hydrogen bonds and nonaromatic carbon-carbon double bonds,
    the surface of which polymer has been modified by treatment with cyanogen azide at a temperature in the range −25° C. to 150° C.

References Cited

UNITED STATES PATENTS

| | | | |
|---|---|---|---|
| 3,268,512 | 8/1966 | Marsh | 260—239 |
| 3,410,658 | 11/1968 | Marsh | 23—204 |

WILLIAM H. SHORT, Primary Examiner

E. NIELSEN, Assistant Examiner

U.S. Cl. X.R.

8—115.5; 260—92.1, 93.1, 93.7, 94.7, 94.9, 96